Aug. 25, 1970 R. E. CRAGG 3,525,832

THREE POSITION TIGHT TAPE SWITCH

Filed Jan. 26, 1968

INVENTOR
RICHARD E. CRAGG

BY Michael A. O'Neil

ATTORNEY

United States Patent Office 3,525,832
Patented Aug. 25, 1970

3,525,832

THREE POSITION TIGHT TAPE SWITCH

Richard E. Cragg, Winnetka, Ill., assignor to Teletype Corporation, Skokie, Ill., a corporation of Delaware Filed Jan. 26, 1968, Ser. No. 700,834
Int. Cl. B65h *25/02*
U.S. Cl. 200—61.13 12 Claims

ABSTRACT OF THE DISCLOSURE

In a tape handling system of the type including a tape utilization device and means for supplying tape to the tape utilization device along two different, nonparallel paths, a combination tight-tape switch and tape guide is positioned at the intersection of the paths. The combination switch and guide comprises a support; a switch actuating lever pivotally mounted on the support; a switch positioned for actuation by the switch actuating member as a result of pivotal movement thereof on the support; and a tape engaging roller mounted on the switch actuating lever for movement with respect thereto. The roller moves into a first tape sensing position wherein it is positioned for sensing tapes directed along one of the paths, into a second tape sensing position wherein it is positioned both for sensing tapes directed along the other of the paths and for guiding said tapes into said one of the paths for engagement with the tape utilization device and into a third non-tape sensing storage position. A detent mechanism is mounted between the switch actuating member and the tape engaging roller for alternately securing the roller in each of the three positions.

BACKGROUND OF THE INVENTION

Tape readers and other data processing devices that utilize paper tapes, magnetic tapes, etc., as data storage media are typically provided with tape tension sensing mechanisms, known in the art as "tight-tape switches," for sensing tape tension and for terminating the feeding of tape when the tension in the tape becomes too great. Also, such mechanisms typically are provided with a variety of tape guiding structures, especially when tapes are directed to a tape utilization device from a plurality of sources. In the past the necessity of providing separate tape tension sensing mechanisms and tape guiding mechanisms for use in conjunction with tape utilization devices has increased the cost of such devices due to the relatively large number of parts that are needed, and has rendered the threading of tape into such devices difficult.

SUMMARY OF THE INVENTION

In the preferred embodiment this invention comprises an inexpensive and easily threaded combined tape sensing and guiding member positioned at the intersection of two tape paths and positionable in at least two positions, one for sensing tape directed along one of the paths and the other for both sensing tapes directed along the other of the paths and guiding said tapes into the first of the paths.

DESCRIPTION OF THE DRAWING

A more complete understanding of the invention may be had by referring to the following detailed description when taken in conjunction with the drawing wherein.

DETAILED DESCRIPTION

Figure 1:
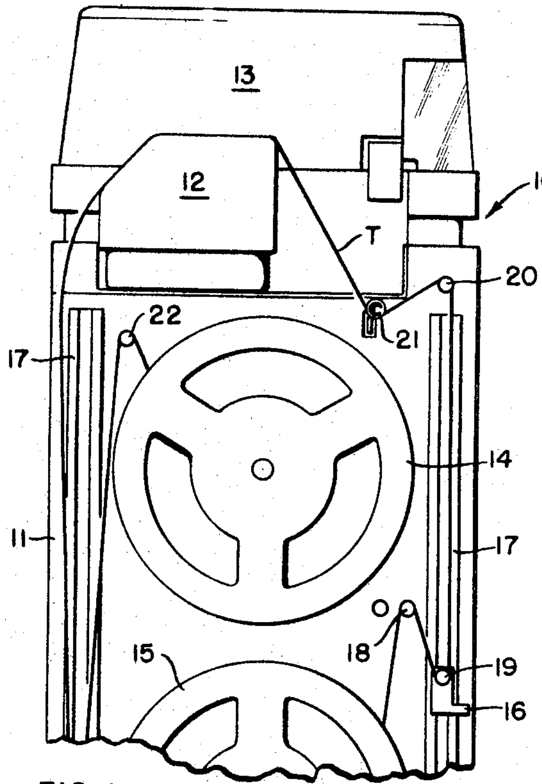
FIG. 1 is a front view of a tape handling mechanism employing the present invention showing tape being fed to a tape utilization device from a first source.

Referring now to the drawing, wherein like reference numerals designate like parts throughout the several views, and referring particularly to FIG. 1 thereof, there is shown a tape handling mechanism 10. The mechanism 10 includes a stand or frame 11 that supports a tape reader 12 and a reperforator 13. The stand 11 also supports a pair of tape reels 14 and 15 that are supported for rotation by a pair of motors (not shown) under the control of a pair of sliders 16 (only one of which is shown) that are mounted in a pair of slider tracks 17. The operation of the tape handling mechanism 10 is fully described in the copending application of R. E. Le Jeune filed Aug. 15, 1967, Ser. No. 660,744, now Pat. No. 3,451,634.

In the mode of operation shown in FIG. 1 the tape handling mechanism 10 operates as a power unwinder-power winder for supplying tape to the tape reader 12 for utilization thereby, and for rewinding the tape after it has been utilized by the reader 12. In this mode the tape T is fed from the reel 15 over a guide 18, under a finger 19 on the slider 16, over a guide 20 and under a combined tape sensing and guiding member 21 into the reader 12. From the reader 12 the tape passes under the finger 19 of the other slider 16 (not shown in the drawing) and over a guide 22 into the reel 14. Throughout its travel from the reel 15 through the reader 12 into the reel 14 the tape T travels in a path that lies in a single plane, which plane extends through the center of the reels 14 and 15 and through the center of the reader 12 perpendicularly to the axes of the reels 14 and 15.

Figure 2:
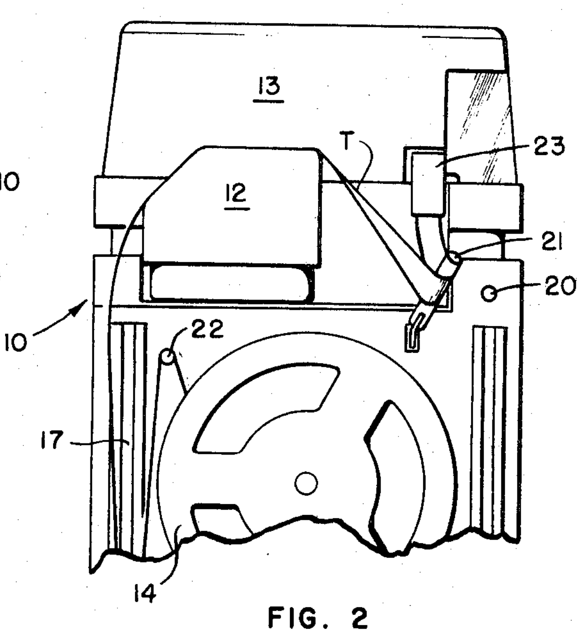
FIG. 2 is a view similar to FIG. 1 showing tape being fed to the tape utilization device from a second source.

In the mode of operation shown in FIG. 2 the tape T passes out an exit chute 23 of the reperforator 13, under the combined tape sensing and guiding member 21, and into the reader 12. From the reader 12 the tape passes under the finger 19 of the slider 16 mounted in the left-hand slider track 17, and over the guide 22 into the reel 14. It should be noted that in this mode the tape T first travels in a path lying in a plane passing through the exit chute 23 of the reperforator 13 and extending parallel to the axis of the reel 14 and is then guided into the path that it followed in the mode shown in FIG. 1 by the combined tape sensing and guiding member 21 which is positioned at the intersection of the planes of the paths of tape travel, and which extends angularly with respect to both planes.

Figures 3, 4:
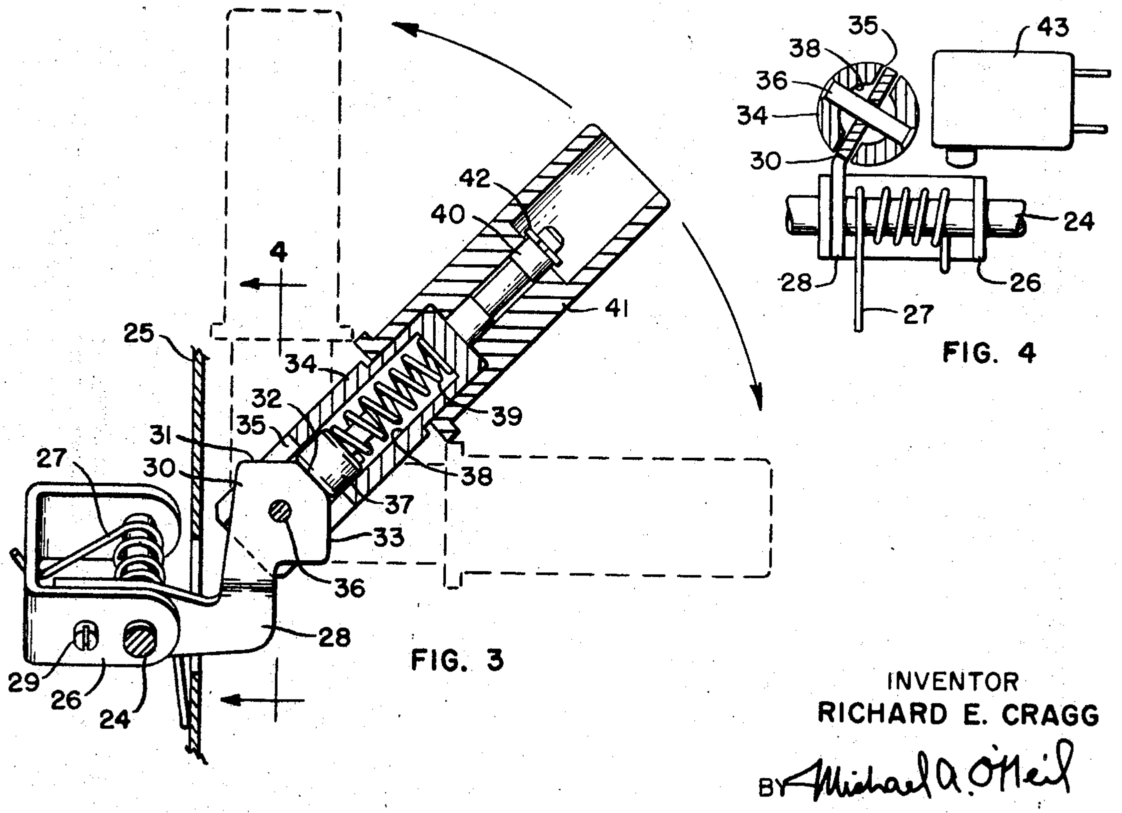
FIG. 3 is an enlarged view of a combined tape sensing and guiding member useful in practicing the invention in which certain parts have been broken away more clearly to illustrate certain features of the invention.
FIG. 4 is a sectional view taken along the line 4—4 in FIG. 3 in the direction of the arrows.

Referring now to FIG. 3 the details of the combined tape sensing and guiding member 21 are shown. The device is mounted on a support rod 24 that is suitably supported on a panel 25 which comprises the front plate of the stand 11. A U-shaped switch actuating bail 26 is pivotally supported on the rod 24, and is urged to rock clockwise with respect thereto (FIG. 3) by a torsion spring 27 mounted on the rod 24 and preloaded between the panel 25 and the bail 26. Also pivotally supported on the rod 24 is an arm 28 that is attached to the bail 26 by a screw 29, and that extends through a hole in the panel 25. The arm 28 has a bent over portion 30 that extends angularly with respect to the bail 26 and that is provided with three detent surfaces 31, 32 and 33.

A tape engaging lever 34 has a slot 35 formed in one of its ends and is mounted on the bent over portion 30 of the arm 28 by a pivot pin 36 with the bent over portion 30 nested within the slot 35. A detent 37 is positioned within a cavity 38 in the lever 34 and is urged into engagement with a selected one of the detent surfaces 31, 32 or 33 of the bent over portion 30 of the arm 28 by a compression spring 39 that is also positioned within the cavity 38. A bearing shaft 40 extends from the end of the lever 34 opposite the slot 35, and a tape engaging roller 41 is rotatably supported on the bearing shaft 40. The roller 41 is prevented from moving axially with respect to the lever 34 by a snap ring 42 secured to the shaft 40.

As is shown in FIG. 4, a switch 43 is positioned over the U-shaped switch actuating bail 26 and is mounted for actuation by the bail 26 in response to changes in the tension of tapes positioned in engagement with the tape engaging roller 41. The relative strengths of the torsion spring 27 and the compression spring 39 are selected so that an increase in the tension of a tape that is engaged with the roller 41 will cause the entire tape sensing and guiding member 21 to pivot about the rod 24 with respect to the panel 25 rather than to cause the lever 34 to pivot about the pin 36 with respect to the arm 28.

As is indicated by the dashed line figures in FIG. 3, the lever 34 and the roller 41 are positionable in three positions with respect to the arm 28. When the lever 34 and the roller 41 are positioned in the vertical position, that is, when the detent 37 is positioned in engagement with the detent surface 31, the combined tape sensing and guiding member 21 is in an idle or storage position. When the lever 34 and the roller 41 are positioned in the position shown in full lines in the drawing; that is, when the detent 37 is positioned in engagement with the surface 32, the combined tape sensing and guiding member 21 occupies the position shown in FIG. 2 in the drawing, that is, it extends angularly with respect to both of the paths of travel of the tape T as it is directed into the reader 12. The angular positioning of the bent over portion 30 provides for this result even though the arm 28 extends perpendicularly to the panel 25 and the rod 24 extends parallel with respect thereto. When the lever 34 and the roller 41 are positioned in the horizontal position shown in the drawing, that is, when the detent 37 is positioned in engagement with the surface 33, the combined tape sensing and guiding member 21 occupies the position shown in FIG. 1 in the drawing. In this position the member 21 extends perpendicularly to the path of travel of the tape T as it passes from the reel 15 to the reader 12.

Although only one embodiment of the invention is shown in the drawings and described in the foregoing specification it will be understood that the invention is not limited to that specific embodiment, but is capable of modification and rearrangement, and substitution of parts and elements without departing from the scope of the invention.

What is claimed is:

1. In a tape handling system of the type including a tape utilization device and means for supplying tape to the tape utilization device along two nonparallel intersecting paths, a combination tape sensing and tape guiding member comprising:
- a support;
- a first lever mounted on the support for movement with respect thereto; and
- a second lever positioned at the intersection of the paths and mounted on the first lever for movement between a position wherein it is positioned for sensing tapes in the first path and a position wherein it is positioned for both sensing tapes in the second path and guiding said tapes into the first path.

2. The combination tape sensing and guiding member according to claim 1 further including detent means for securing the second lever in either of the two positions on the first lever.

3. The combination tape sensing and guiding member according to claim 1 wherein the second lever extends from the first lever substantially perpendicularly with respect to the first path when it is in its first position and extends angularly with respect to both the first and the second paths when it is in its second position.

4. A tape handing apparatus comprising:
- a support;
- a tape utilization device mounted on the support and including means for receiving tape in a first plane;
- first means mounted on the support for directing tape to the tape utilization device in the first plane;
- second means mounted on the support for directing tape to the tape utilization device in a second plane that extends angularly with respect to the first plane;
- a movable tape sensing member mounted on the support and positionable for engagement with tape directed to the tape utilization device by either the first or second tape directing means; and
- means engaging the tape sensing member for orienting the tape sensing member in different tape sensing positions with respect to the tape utilization device for engagement with tapes directed to the tape utilization device by the two tape directing means.

5. The tape handling apparatus according to claim 4 wherein the second plane extends substantially perpendicularly to the first plane and wherein the tape sensing member is positioned at the intersection of the planes.

6. The tape handling apparatus according to claim 5 wherein the orienting means positions the tape sensing member in a first position wherein it extends perpendicularly to the first plane and parallel to the second plane and in a second position wherein it extends angularly with respect to both the first and the second planes.

7. The tape handling device according to claim 4 wherein the tape sensing member includes a switch actuating member and a tape engaging member and wherein the orienting means includes a detent interconnection between the switch actuating member and the tape engaging member for supporting the tape engaging member on the switch actuating member in at least two different positions with respect thereto.

8. In a tight-tape switch of the type including a support member, a switch actuating member movably mounted on the support member, and a tape sensing member mounted on the switch actuating member for engaging tapes and for changing the position of the switch actuating member, the improvement comprising:
- means for mounting the sensing member movably on the switch actuating member; and
- means for positioning the sensing member in at least two different tape engaging positions with respect to the switch actuating member so that such position locates the sensing member for engagement with a tape coming from a different direction.

9. The combination according to claim 8 further including means for positioning the sensing member in a third, storage position with respect to the switch actuating member.

10. The combination according to claim 8 wherein the means for positioning the sensing member is a detent mechanism comprising a detent mounted on one of the members, a spring for urging the detent into engagement with the other of the members, and means on the other of the members for cooperation with the detent to locate the sensing member in the two positions with respect to the switch actuating member.

11. The combination according to claim 8, further including means for directing tape to the sensing member from a first direction and means for directing tape to the sensing member from a second direction that is angularly offset with respect to the first direction and wherein the positioning means locates the sensing member in angularly offset positions with respect to the switch actuating member that correspond to the angularly offset directions from which tape is directed to the sensing member.

12. The combination according to claim 8, wherein the positioning means comprises:

at least two angularly offset edges on the switch actuating member;

a detent mounted on the sensing member for engagement with the offset surfaces of the switch actuating member;

means for urging the detent into engagement with the offset surfaces; and means for supporting the sensing member on the switch actuating member for movement with respect thereto to bring the detent alternately into engagement with the offset surfaces thereof.

References Cited

UNITED STATES PATENTS

| | | | |
|---|---|---|---|
| 3,079,100 | 2/1963 | Brown et al. | 242—57 X |
| 3,201,057 | 8/1965 | Ryan | 242—57 X |
| 3,398,248 | 8/1968 | Klauss | 200—153 |
| 3,405,857 | 10/1968 | Albrecht | 242—75.3 X |

HERMAN O. JONES, Primary Examiner

U.S. Cl. X.R.

242—57